(12) United States Patent
Murata

(10) Patent No.: US 6,829,766 B1
(45) Date of Patent: Dec. 7, 2004

(54) DATA PROCESSING METHOD AND APPARATUS AND RECORDING MEDIUM, FOR IMPLEMENTING A SCHEDULE MANAGING MECHANISM WHEN A CONTEXT SWITCH HAS OCCURRED

(75) Inventor: Seiji Murata, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/154,105

(22) Filed: Sep. 16, 1998

(30) Foreign Application Priority Data

Sep. 18, 1997 (JP) ............................................. 09-253889

(51) Int. Cl.[7] ................................................. G06F 9/00
(52) U.S. Cl. ........................ 718/108; 718/100; 718/102
(58) Field of Search ................................ 709/100, 310; 714/38, 39, 45; 718/100, 101, 102, 103, 104, 105, 107, 108

(56) References Cited

U.S. PATENT DOCUMENTS

| | | | | |
|---|---|---|---|---|
| 5,459,845 A | * | 10/1995 | Nguyen et al. ............. | 712/248 |
| 5,485,626 A | * | 1/1996 | Lawlor et al. .............. | 709/315 |
| 5,594,864 A | * | 1/1997 | Trauben ...................... | 714/39 |
| 5,692,193 A | * | 11/1997 | Jagannathan et al. ....... | 709/106 |
| 5,802,272 A | * | 9/1998 | Sites et al. .................... | 714/45 |
| 5,872,909 A | * | 2/1999 | Wilner et al. ................ | 714/38 |
| 6,029,205 A | * | 2/2000 | Alferness et al. ........... | 709/300 |
| 6,341,301 B1 | * | 1/2002 | Hagan ........................ | 709/100 |

* cited by examiner

Primary Examiner—Majid A. Banankhah
(74) Attorney, Agent, or Firm—Frommer Lawrence & Haug LLP; William S. Frommer

(57) ABSTRACT

An operating system is provided that employs a nano-kernel and that reduces the number of times of revocation of a scheduler without impairing operation of a system incorporating the operating system. Each time a context switch occurs to switch from one to another thread, the operating system records the history of the context switch. When a scheduler that controls the sequence of execution of threads is invoked, a queue managed by the scheduler is updated tracking back the recorded history.

9 Claims, 14 Drawing Sheets

DATA PROCESSING METHOD AND APPARATUS AND RECORDING MEDIUM, FOR IMPLEMENTING A SCHEDULE MANAGING MECHANISM WHEN A CONTEXT SWITCH HAS OCCURRED

BACKGROUND OF THE INVNETION

1. Field of the Invention

The present invention relates to a data processing method and, more particularly, to a schedule managing mechanism implemented by an operating system. The present invention also relates to a recording medium storing such an operating system, as well as to a data processing apparatus employing such a recording medium. Details of certain features of the present invention are described in European Patent Application No. 0.753,811 A1 entitled "Data processing method and device" and filed by the same assignee on Jul. 12, 1996 claiming a Convention Priority on JP 178625/95, filed 1997 Jul. 7, the complete disclosure of which is hereby incorporated herein by reference.

2. Description of the Related Art

Operating systems can be sorted into the following three types: operating systems using so-called fat kernels, operating systems employing so-called micro-kernels and operating systems adopting so-called nano-kernels.

In a fat-kernel-type operating system, all the functions of the system are packaged in a fat kernel. Referring to FIG. 12, when an application program requests the operating system to provide a service that is accompanied by a change in thread status, a system call is made to invoke from the kernel a module corresponding to the requested service, such as "Mailer" or "Synchronization". Subsequently, in order to enable such a module to change the statuses of threads, a so-called function call is performed to invoke a "Scheduler" which controls the sequence of execution of the threads to manage the schedule of these threads, whereby the processing involving a change in the thread status is performed.

In order to package various functions in the operating system using a fat kernel, a programmer is required to have sufficient knowledge about the kernel because all the functions have to be packaged in the kernel. Further, alteration of functions cannot easily be effected since these functions are packaged in the kernel. Thus, the operating systems employing fat kernels generally have limited versatility.

Referring now to micro-kernel type operating system, the micro-kernel accommodates only basic functions such as hardware control functions, while other functions of the operating system are implemented externally of the micro-kernel. This type of operating system, therefore, is free from the problem of limited versatility that is inherent in the operating systems of fat-kernel type, because only selected functions are packaged in the kernel.

As shown in FIG. 13, the micro-kernel-type operating system permits not only application programs but also modules which provide operating system functions, e.g., "Synchronization", "Mailer" and "Schedule" shown in FIG. 13, to run on the micro-kernel. Therefore, these modules providing the operating system functions are under the schedule control of the Scheduler loaded in the micro-kernel.

In the micro-kernel-type operating system, interactions between application programs and modules are conducted by means of a communication mechanism "Mailer" which is provided by the micro-kernel. At the same time, the modules that provide the operating system functions control the execution of application programs, by indirectly invoking the "Scheduler" in the micro-kernel via an interface which also is provided by the micro-kernel.

Referring now to FIG. 14, in a nano-kernel-type operating system, only a context switch mechanism that undertakes switching of contexts is extracted from the contents of a micro-kernel. The extracted context switch mechanism forms a nano-kernel.

Thus, in the nano-kernel-type operating system, the context switch mechanism that has dependency on the type of CPU and so forth is extracted and abstracted. This offers greater ease of programming, as well as higher kernel mobility.

In order to obtain enhanced versatility of operating systems, as well as higher kernel mobility and greater ease of programming, a micro-kernel-type operating system is preferred to a fat-kernel-type operating system, and a nano-kernel-type operating system is preferred to a micro-kernel-type operating system.

A micro- or nano-kernel-type operating system, however, requires a large number of context switches. This is because the communication mechanism and the scheduler of the micro-kernel have to be invoked each time of execution of any of execution entities such as the application programs which are operated on the operating system, objects which provide functions of the operating system, and so forth. Consequently, overall performance of the micro- or nano-kernel-type operating system is inferior to that of fat-kernel-type operating system.

The operating system employing a nano-kernel system requires a context switch even for the purpose of calling the communication mechanism or the scheduler. This type of operating system, therefore, further increases overheads of cost due to the use of greater number of context switches beyond the cost incurred in the micro-kernel-type operating system.

Thus, the use of a nano-kernel undesirably impairs the performance of the entire system due to increase in the number of the context switches. A solution to this problem might be to suppress invocation of the scheduler when context switch is performed. A mere suppression of invocation of the scheduler, however, hampers the schedule management and, hence, the system operation.

More specifically, omission of a scheduler invocation causes the scheduler to fail to receive information necessary for schedule management, resulting in discordance between the actual system status and the status understood by the scheduler. Consequently, the scheduler is disabled to perform appropriate schedule management. Omission of a scheduler invocation also poses the following problem. In general, when the queue in a thread under the schedule control by a scheduler is changed, the scheduler performs rescheduling such that processings of higher priorities are executed preferentially. Such rescheduling is not performed when the invocation the scheduler is omitted. Processings of higher priorities, therefore, may be delayed undesirably.

SUMMARY OF THE INVENTION

Accordingly, an object of the present invention is to provide a data processing method employing a nano-kernel, wherein the number of calls for a scheduler is minimized without impairing operation of a system which adopts this method. It is also an object of the present invention to provide a recording medium containing a program that implements the data processing method, as well as a data processing apparatus employing such a recording medium.

To these ends, according to one aspect of the present invention, there is provided a data processing method in which, when a context switch has occurred to switch the thread to be executed, the history of the context switch is recorded. Then, when a scheduler for controlling the execution sequence of threads is invoked, a queue managed by the scheduler is updated tracing back the recorded history of the context switch.

Thus, in the data processing method of the present invention, a queue is updated tracing back the record of context switch history when a scheduler is invoked. The scheduler, therefore, can correctly manage the schedule even if any context switch has been performed without invoking the scheduler.

The updating may be performed by setting a predetermined flag on a thread that causes a context switch which requires alteration of sequence in the queue, and invoking, in response to an occurrence of a new context switch, the scheduler to alter the sequence in the queue when the thread that has caused the new context switch bears the flag. This ensures that sequence in the queue is re-scheduled at appropriate timings, thus eliminating inconvenience such as delaying of a processing having a high priority.

The setting of the flag may be conducted such that the thread on which the flag is set differs according to the type of the invocation of the scheduler. This ensures that re-scheduling in the queue is executed at timings that are more appropriate.

According to another aspect of the present invention, there is provided a computer-readable recording medium containing an operating system having a scheduler that controls the sequence of execution of threads. The operating system implements a data processing method in which, when a context switch has occurred to switch the thread to be executed, the history of the context switch is recorded. Then, when a scheduler for controlling the execution sequence of threads is invoked, a queue managed by the scheduler is updated tracing back the recorded history of the context switch.

Thus, in the method implemented by the operating system contained in the recording medium of the invention, a queue is updated tracing back the record of context switch history when a scheduler is invoked. The scheduler, therefore, can correctly manage the schedule even if any context switch has been performed without invoking the scheduler.

The updating may be performed by setting a predetermined flag on a thread that causes a context switch which requires alteration of sequence in the queue, and invoking, in response to an occurrence of a new context switch, the scheduler to alter the sequence in the queue when the thread that has caused the new context switch bears the flag. This ensures that sequence in the queue is re-scheduled at appropriate timings, thus eliminating inconvenience such as delaying of a processing having a high priority.

The setting of the flag may be conducted such that the thread on which the flag is set differs according to the type of the invocation of the scheduler. This ensures that re-scheduling in the queue is executed at timings that are more appropriate.

In accordance with still another aspect of the present invention, there is provided a data processing apparatus having a computer-readable recording medium containing an operating system having a scheduler that controls the sequence of execution of threads. The operating system implements a data processing method in which, when a context switch has occurred to switch the thread to be executed, the history of the context switch is recorded. Then, when a scheduler for controlling the execution sequence of threads is invoked, a queue managed by the scheduler is updated tracing back the recorded history of the context switch.

Thus, in the data processing apparatus of the present invention, a queue is updated tracing back the record of context switch history when a scheduler is invoked. The scheduler, therefore, can correctly manage the schedule even if any context switch has been performed without invoking the scheduler.

The updating may be performed by setting a predetermined flag on a thread that causes a context switch which requires alteration of sequence in the queue, and invoking, in response to an occurrence of a new context switch, the scheduler to alter the sequence in the queue when the thread that has caused the new context switch bears the flag. This ensures that sequence in the queue is re-scheduled at appropriate timings, thus eliminating inconvenience such as delaying of a processing having a high priority.

The setting of the flag may be conducted such that the thread on which the flag is set differs according to the type of the invocation of the scheduler. This ensures that re-scheduling in the queue is executed at timings that are more appropriate.

These and other objects, features and advantages of the present invention will become clear from the following description when the same is read in conjunction with the accompanying drawings.

DESCRIPTION OF THE PREFERRED EMBODIMENTS

A description will now be given of preferred embodiments of the present invention with reference to the drawings.

1. Hardware environment

Figure 1:
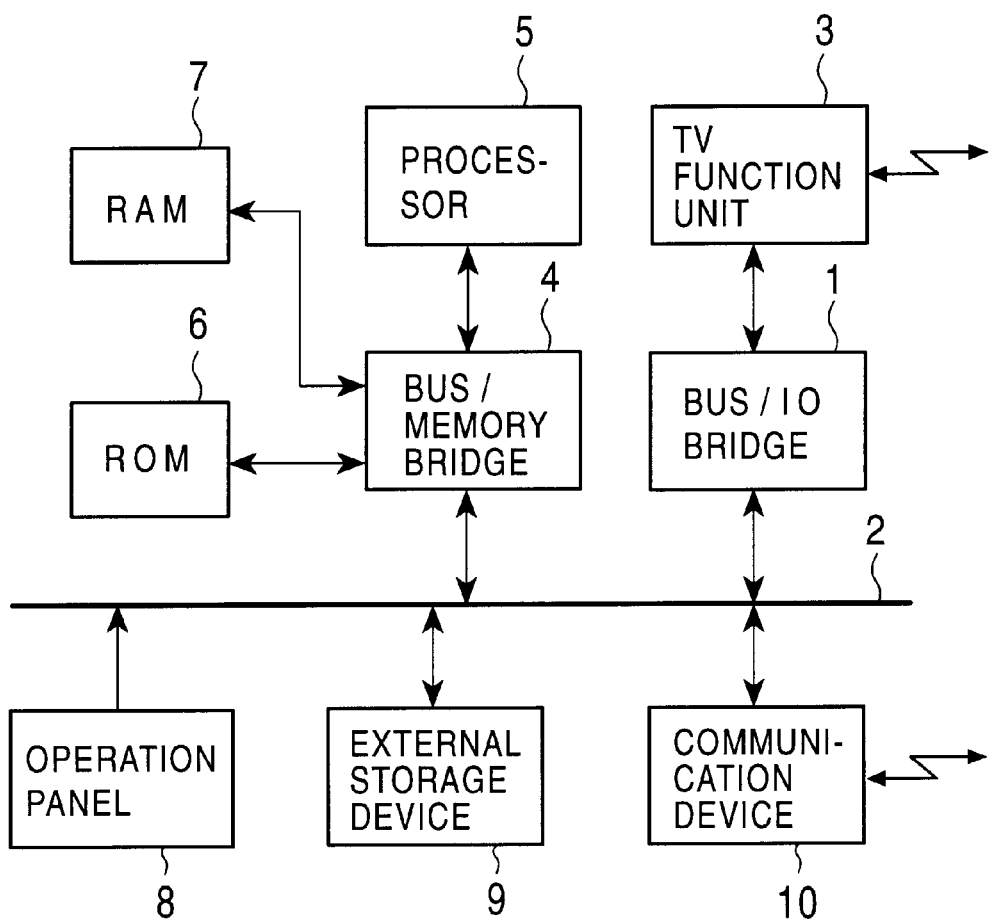
FIG. 1 is a schematic illustration of configuration of a TV system incorporating the present invention.

FIG. 1 shows, by way of example, a hardware architecture incorporating the present invention. Although a TV system is specifically mentioned in the following description, it is to be understood that the present invention can also be applied to a variety of types of data processing apparatuses which employ operating systems. For instance, the present invention can effectively be used in audio-visual systems, i.e., so-called AV systems, office machines, computers, and so forth, as well as in the television system which will now be described.

Referring to FIG. 1, the TV system as an embodiment of the data processing apparatus of the invention receives signals from a station via air (antenna) or through a cable. The TV system displays an image based on the received signal on a CRT or a liquid crystal display device while outputting acoustic signals from a speaker.

This TV system has, besides ordinary TV functions, a function for receiving programs and data that are given externally. More specifically, the TV system as shown in FIG. 1 has a TV function unit 3 connected to a BUS 2 through a BUS/IO bridge 1, a processor 5 connected to the BUS 2 through a BUS/MEMORY bridge 4, a ROM (Read Only Memory) 6 and a RAM (Random Access Memory) 7 which also are connected to the processor 5 through the BUS/MEMORY bridge 4, an operation panel 8 connected to the BUS 2, and an external storage device 9 and a communication device 10 which are also connected to the BUS 2.

The TV function unit 3 has a function for generating images and voices based on signals received via air or a cable, and is connected to the BUS 2 through the BUS/IO bridge 1 for communication with other devices of the system.

The processor 5 controls operations of various devices constituting the TV system. To this end, the processor 5 is connected to the BUS 2 via the BUS/MEMORY bridge 4. To the processor 5 are also connected the ROM 6 and the RAM 7 via the BUS/MEMORY bridge 4.

The ROM 6 stores an operating system, application programs and so forth that implement the controls to be performed by the processor 5. In this embodiment, the operating system employs a nano-kernel and is object-oriented. Thus, the operating system is an object-oriented, nano-kernel operating system.

The RAM 7 is used as a work area for the processor 5. Thus, the processor 5 uses the RAM 7 as the work area when executing the operating system and the application programs, thereby controlling the operations of various devices constituting the TV system.

The operation panel 8 serves as an input device which receives operational instructions input by the user, such as instructions for channel changeover or volume control.

Practically, the operation panel 8 has an input device such as a console having a plurality of buttons, a pointing device such as a mouse, and so on. Signals input through the operation panel 8 are delivered to the processor 5 via the BUS 2 and the BUS/MEMORY bridge 4. Based on the signals input through the operation panel 8, the processor 5 performs various computations to control the component devices.

The external storage device 9, which may be a hard disk device, stores image data, control data and application programs downloaded from an external system via the communication device 10. Thus, the communication device 10 serves as an I/O unit which undertakes signal exchanges with the external system, and comprises, for example, a MODEM or a terminal adapter.

The TV system not only performs ordinary TV functions provided by the TV function unit 3 but also has various other functions. For instance, the TV system can receive programs and data from external systems via the communication device 10. This function enables updating of versions of the operating system and the device drivers simply by receiving new software modules from an external network via the communication device 10.

This TV system executes, under the control of the processor 5, the operating system stored in the ROM 6, and allows application programs stored in the ROM 6 or the external storage device 9 to run on the operating system, thereby controlling the component devices. Thus, the ROM 6 serves as a computer-readable storage medium that stores the operating system and the device drivers. The operating system, however, may be stored in the RAM 7 or in the external storage device 9. Storage in the RAM 7 or the external storage device 9 is preferred when rewriting of the operating system and device drivers is necessary.

2. Software Environment

A description will now be given of the software environment of the TV system.

2-1 Outline of Operating System Architecture

Figure 2:
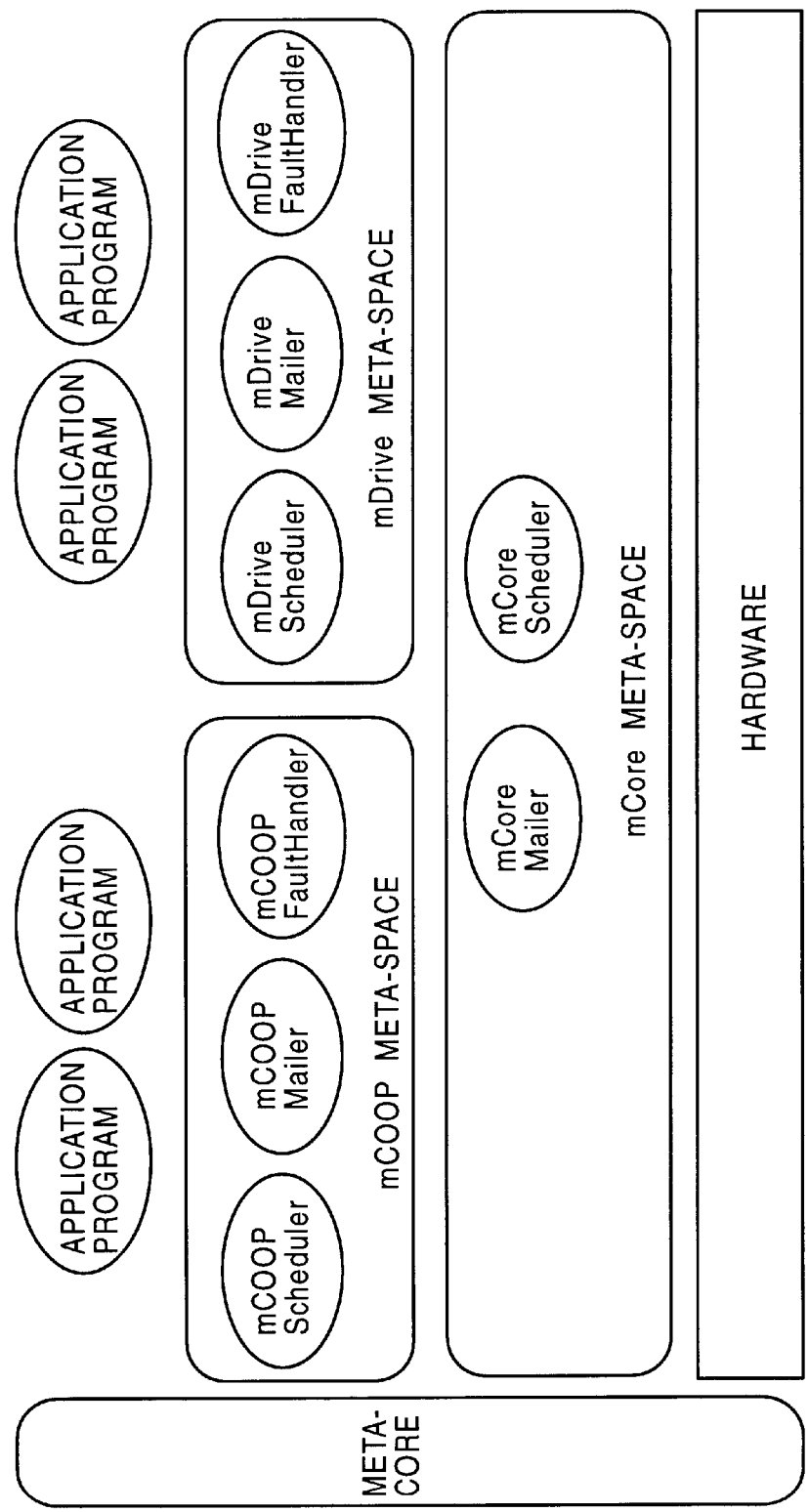
FIG. 2 is an illustration of hierarchical structure of an operating system incorporating the present invention.

The operating system used in this TV system is a nano-kernel-type operating system that employs a nano-kernel. As shown in FIG. 2, a meta-core (MetaCore) is incorporated to serve as the nano-kernel that undertakes context switch.

This nano-kernel-type operating system is object-oriented. Thus, the execution entities that run on the meta-core serving as the nano-kernel are objects. Object interaction is accomplished by message passing.

This operating system is capable of simultaneously providing a plurality of program execution environments. In the following description, program execution environments provided by the operating system will be referred to as meta-spaces. This operating system provides three types of meta-spaces as shown in FIG. 2, namely, a meta-space mCOOP, a meta-space mDrive and a meta-space mcore. Each of these meta-spaces is constituted by a plurality of objects. In the following description, each meta-space as a constituent of a meta-space will be referred to as a "meta-object".

The meta-space mCOOP is used to enable running of an object-oriented application program such as a program for implementing a graphical user interface that enables control of the operation panel 8. The heading character "m" of the representation mCOOP is a sign indicative of a meta-space, while "COOP" is an abbreviation of "Concurrent Object Oriented Programming".

The meta-space mDrive is used for running device drivers that undertake controls of hardware devices. The heading character "m" of the representation mDrive is a sign indicative of a meta-space, while "Drive" shows that this meta-space is used for running device drivers.

The meta-space mCore is used for running meta-objects that constitute the meta-spaces mCOOP and mDrive. Thus, the meta-space mCore corresponds to a micro-kernel. The heading character "m" of the representation mcore is a sign indicative of a meta-space, while "Core" indicates that this meta-space constituting a "core" of the operating system.

Thus, the hierarchical structure of the operating system is such that, as shown in FIG. 2, the meta-space mCore on which the meta-spaces mCOOP and mDrive operate runs on a hardware device such as a CPU, and the object-oriented application programs and the device drivers respectively run on the meta-space mCOOP and the meta-space mDrive. Context switches between these contexts are controlled by the meta-core.

The operating system also can provide, besides the meta-spaces mCOOP and mDrive, other meta-spaces capable of running on the meta-space mCore, such as a procedural application program, e.g., an application program for enabling the TV function unit to display moving pictures. However, explanation of meta-spaces other than the meta-spaces mCOOP and mDrive is omitted in the following description because the invention can equally be carried out with various types of meta-spaces that can operate on the meta-space mCore. Thus, the meta-spaces mCOOP and mDrive will be specifically mentioned in the following description by way of example.

2-2 Meta-Objects

As shown in FIG. 2, there are three types of meta-objects that constitute the meta-space mCOOP: namely, an object "mCOOPScheduler", an object "mCOOPMailer" and an object "mCOOPFaultHandler". The object mCOOPScheduler is a so-called "scheduler" which is a meta-object that undertakes schedule management for application programs that run on the meta-space mCOOP. The object mCOOP-Mailer is a meta-object that conducts message passing between the application programs that run on the meta-space mCOOP. The object mCOOPFaultHandler is a meta-object for exception handling. The meta-space mCOOP has various meta-objects as the constituents, in addition to the meta-objects specifically mentioned above.

Referring further to FIG. 2, there are three types of meta-objects that constitute the meta-space mDrive: namely, an object "mDriveScheduler", an object "mDriveMailer" and an object "mDriveFaultHandler". The object mDrive-Scheduler is a so-called "scheduler" which is a meta-objects that undertakes schedule management for device drivers that run on the meta-space mDrive. The object mDriveMailer is a meta-object that conducts message passing between the device drivers that run on the meta-space mDrive. The object mDriveFaultHandler is a meta-object for exception handling. The meta-space mDrive has various meta-objects as the constituents, in addition to the meta-objects specifically mentioned above.

Referring further to FIG. 2, there are two types of meta-objects that constitute the meta-space mCore: namely, an object "mCoreScheduler" and an object "mCoreMailer". The object mCoreScheduler is a so-called "scheduler" that is a meta-objects that undertakes schedule management for objects that run on the meta-space mCore. The object mCoreMailer is a meta-object that conducts message passing between the objects that run on the meta-space mCore. The meta-space mCore too has various meta-objects as the constituents, in addition to the two types of meta-objects specifically mentioned above.

Although in the described embodiment each meta-space employs its own meta-object as a scheduler, this is not exclusive and the arrangement may be such that a scheduling meta-object is commonly used by all meta-spaces. In such an arrangement, for instance, a single scheduling meta-object acts as a meta-object belonging to the meta-space mCOOP when used in this meta-space. Similarly, the same scheduling meta-object acts as an object belonging to the meta-space mDrive when used in this meta-space and as an object belonging to the meta-space mCore when used in this meta-space.

Objects that run on a meta-space will be referred to as "base objects" in the following description. An invocation of a meta-object, executed to enable a base object to enjoy services offered by the meta-object, will be referred to as a "meta-call". Thus, the meta-call is equivalent to a system call for an operating system of fat-kernel type. Context switch between a base object and a meta-object is conducted by the meta-core which corresponds to the nano-kernel.

In the following description, the term "scheduler" is used to collectively mean the scheduling meta-objects including the object mCOOPScheduler, the object mDriveScheduler and the object mCoreScheduler.

2-3 Conventional Schedule Managing Mechanism

Figure 3:
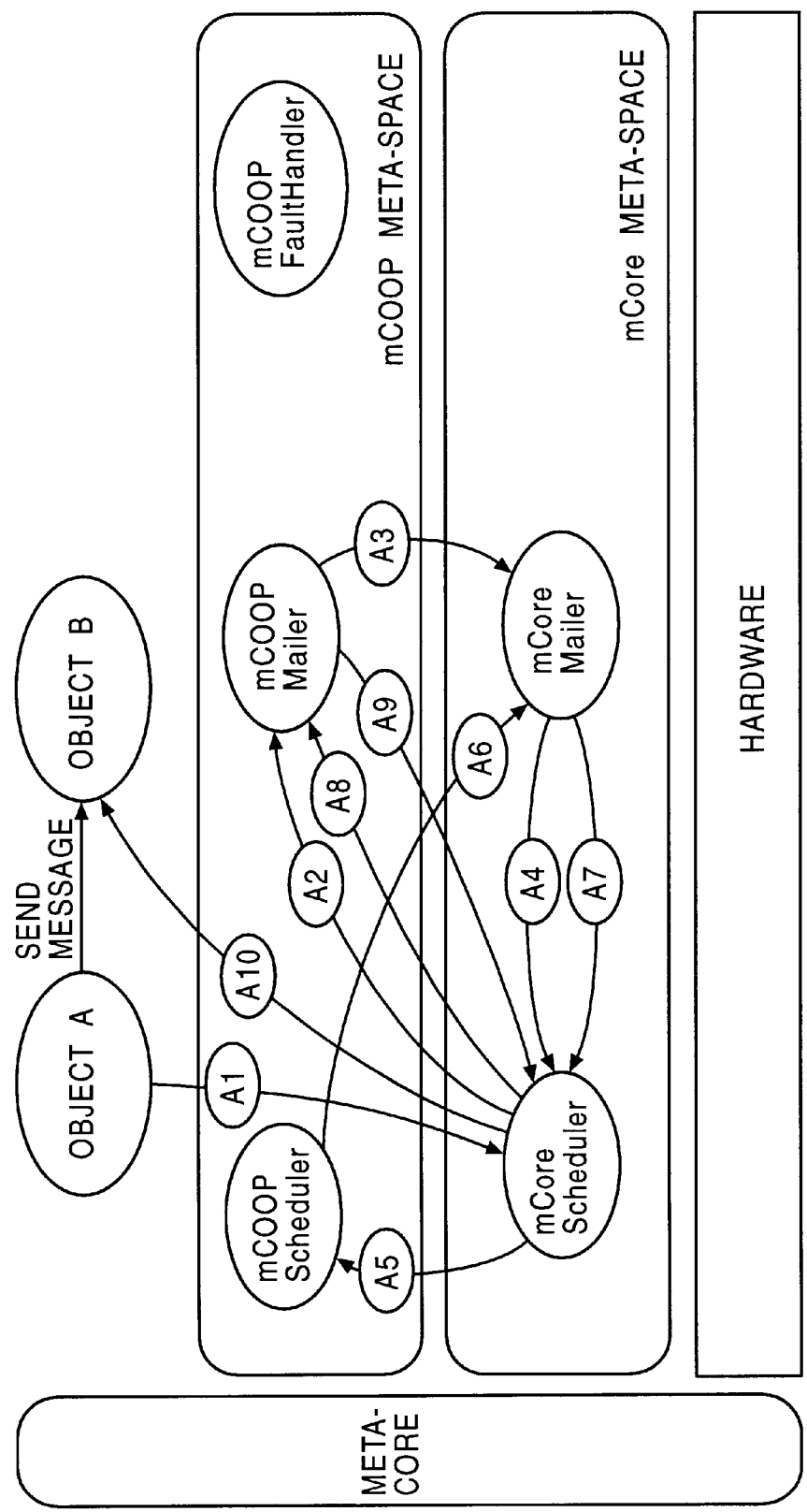
FIG. 3 is an illustration of a conventional schedule managing mechanism showing particularly a procedure for sending message from an object A to another object B, as well as hierarchical structure of an operating system.
Figure 4:
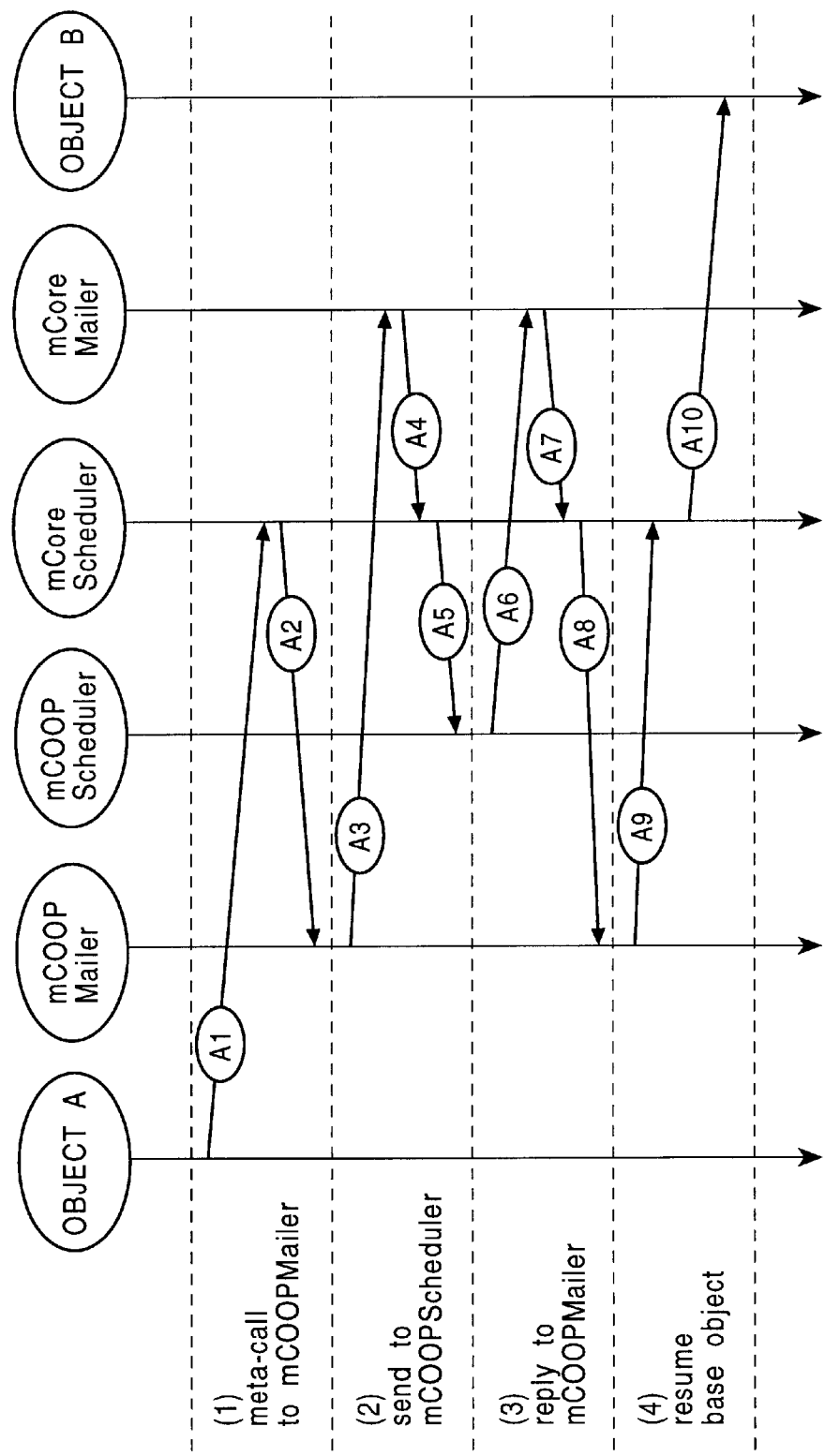
FIG. 4 is an illustration of the conventional schedule managing mechanism showing, by means of a time chart, object interaction between the object A and the object B to enable the sending of message from the object A to the object B.

Before turning to the description of the embodiments, a description will be given of a conventional schedule management adopted in a nano-kernel-type operating system. The description will proceed with specific reference to FIGS. 3 and 4 which show an operation for sending message from an object A which is an application program that runs on the meta-space mCOOP to another object B which also is an application program that runs on the same meta-space mCOOP. FIG. 3 shows, together with hierarchical structure of the operating system, a procedure for sending a message from the object A to the object B. Illustration of the meta-space mDrive is omitted from FIG. 3. FIG. 4 is a time chart show9ing the object interaction between the objects A and B executed to enable mailing of message from the object A to the object B.

The procedure is as follows.

(1) Meta-Call to mCOOPMailer

As the first step, a meta-call is made by the object A to invoke the object "mCOOPMailer" on the meta-space mCOOP. Thus, in order to enable message passing from the object A to the object B, the object "mCOOPMailer" that undertakes message passing between objects on the meta-space mCOOP is invoked.

More specifically, for the purpose of invoking the object "mCOOPMailer" that handles the meta-call from the object A, a call is made as indicated by the arrow A1 to invoke the object "mCoreScheduler" of the meta-space mCore on which the designated object "mCOOPMailer" runs. Thus, the objects on the meta-space mCore are under the schedule control of the object "mCoreScheduler". In this state, designated object "mCOOPMailer" on the meta-space mCOOP is called as indicated by the arrow A2.

(2) Send to mCOOPScheduler

Then, in order to start the object B, the object "mCOOP-Mailer" sends a message to the object "mCOOPScheduler" on the meta-space mCOOP. More specifically, the starting of the object B requires schedule management of objects running on the meta-space mCOOP. The above-mentioned message which is necessary to start the object B is therefore sent to the object "mCOOPScheduler" which conducts schedule management of the objects on the meta-space mCOOP.

To explain in more detail, the sending of the message from the object "mCOOPMailer" to the object "mCOOPScheduler" begins with a call indicated by the arrow A3 for invoking the object "mCoreMailer" which is the meta-object in charge of the message passing between objects working on the meta-space mCore. Subsequently, as indicated by the arrow A4, the object "mCoreScheduler" which is a meta-object in charge of schedule management of the objects on the meta-space mcore is called, since the message-destination object "mCOOPScheduler" runs on the meta-space mCore. Thus, the objects on the meta-space mCore are under the schedule control performed by the object "mCore-Scheduler". Under this schedule control, the object "mCOOPScheduler" is triggered as indicated by the arrow A5, and the above-mentioned message necessary for starting the object B is sent to this object "mCOOPScheduler".

(3) Reply to mCOOPMailer

Upon receipt of the message, the object "mCOOPScheduler" alters the state of the object B in accordance with the received message and sends a reply for this message to the object "mCOOPMailer".

To explain in more detail, this replying operation is performed as follows. In order to enable sending of the reply from the object "mCOOPScheduler" to the object "mCOOPMailer", a call is made as indicated by the arrow A6 to call the object "mCoreMailer" that undertakes message passing between the objects running on the meta-space mcore. Then, in order to enable the reply destination object "mCOOPMailer" to work on the meta-space mcore, a call is made as indicated by the arrow A7 to invoke the object "mCoreScheduler" which is the meta-object in charge of the schedule management for the objects on the meta-space mcore. Under the schedule management for the objects on the meta-space mcore performed by the object "mCoreScheduler", the object "mCOOPMailer" is triggered as indicated by the arrow A8, and the reply from the object "mCOOPScheduler" is sent to the triggered object "mCOOPMailer".

(4) Resume Base Objects

Processing of the objects A and B is commenced when the processing performed by the object "mCOOPMailer" is completed.

This handling begins with a call indicated by the arrow A9 for invoking the object "mCoreScheduler". After a processing such as rescheduling is performed by the object "mCoreScheduler", the object B as a base object is called as indicated by the arrow A10, whereby the processing is started. It is to be noted, however, the processing is started first with the object A, i.e., the arrow A10 calls the object A, if priority has been given to the processing of the object A than to the processing of the object B.

The procedure for the message passing from the object A to the object B under the control of a conventional schedule managing mechanism has been described. It will be seen that the conventional schedule managing mechanism requires excessively large number of switching of objects to be executed, i.e., too many context switches. In the illustrated system, these context switches are controlled and executed by the meta-core that serves as a nano-kernel. Such excessively large number of context switches undesirably impairs overall performance of the system. Thus, it has been difficult to improve the overall performance of the entire system with the use of the conventional schedule managing mechanism that requires impractical large number of context switches.

2-4 Schedule Managing Mechanism Incorporating the Invention

A description will now be given of a schedule managing mechanism incorporating the present invention.

In general, object interactions have mutual dependency. Thus, there are cases where the sequence of transition of executions between objects is not changed irrespective of whether or not a scheduling is conducted. In such cases, according to the invention, scheduling operation is omitted by intentionally prohibiting invocation of the scheduler. Thus, in accordance with the present invention, the frequency of the scheduler invocation is reduced, by virtue of an effective use of the seriality of the object execution transition. This serves to reduce the number of context switches correspondingly, contributing to improvement in the overall performance of the system.

2-4-1 Schedule Management Procedure

Figure 5:
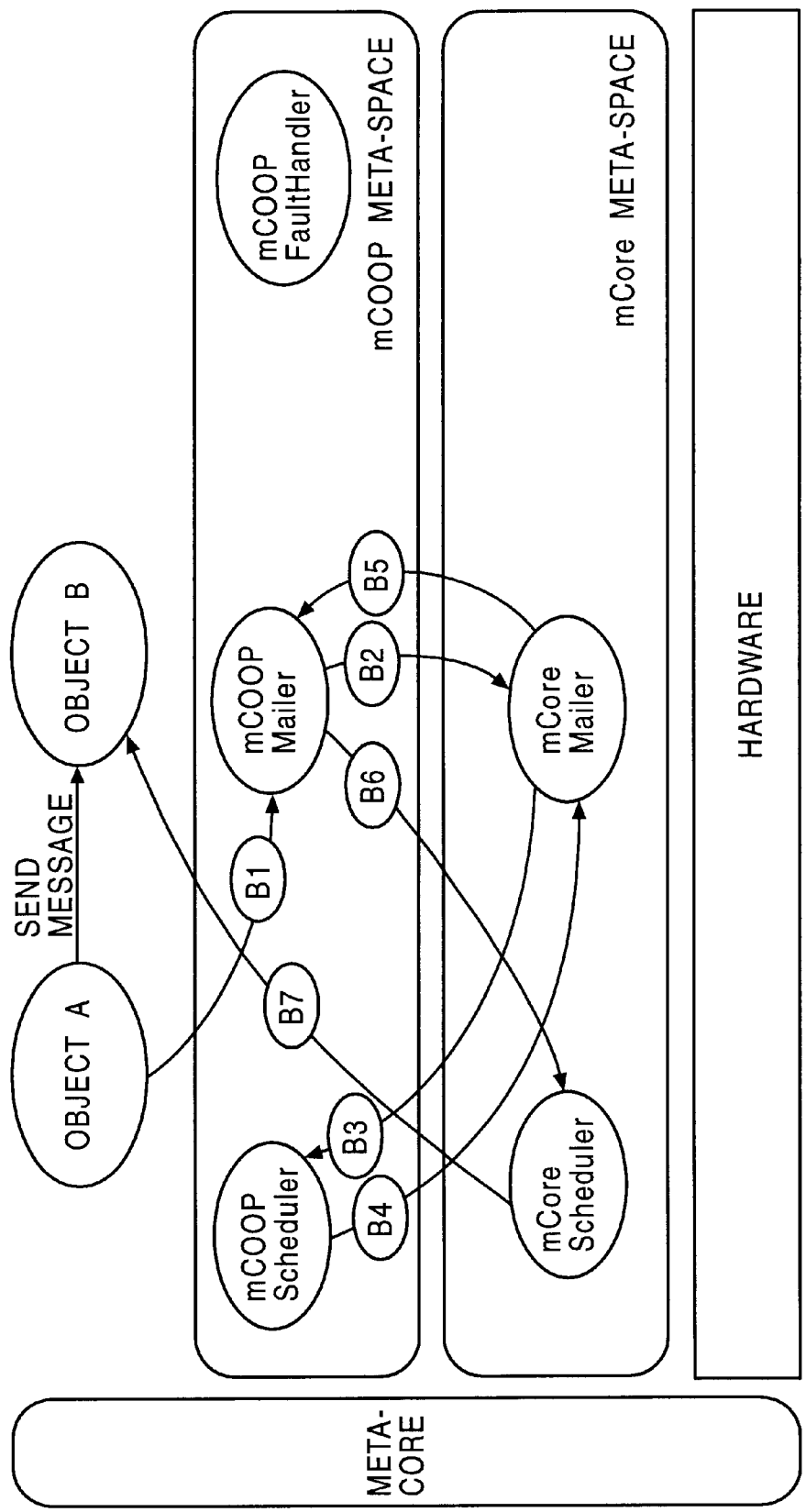
FIG. 5 is an illustration of a schedule managing mechanism embodying the present invention showing particularly a procedure for sending message from an object A to another object B, as well as hierarchical structure of an operating system.
Figure 6:
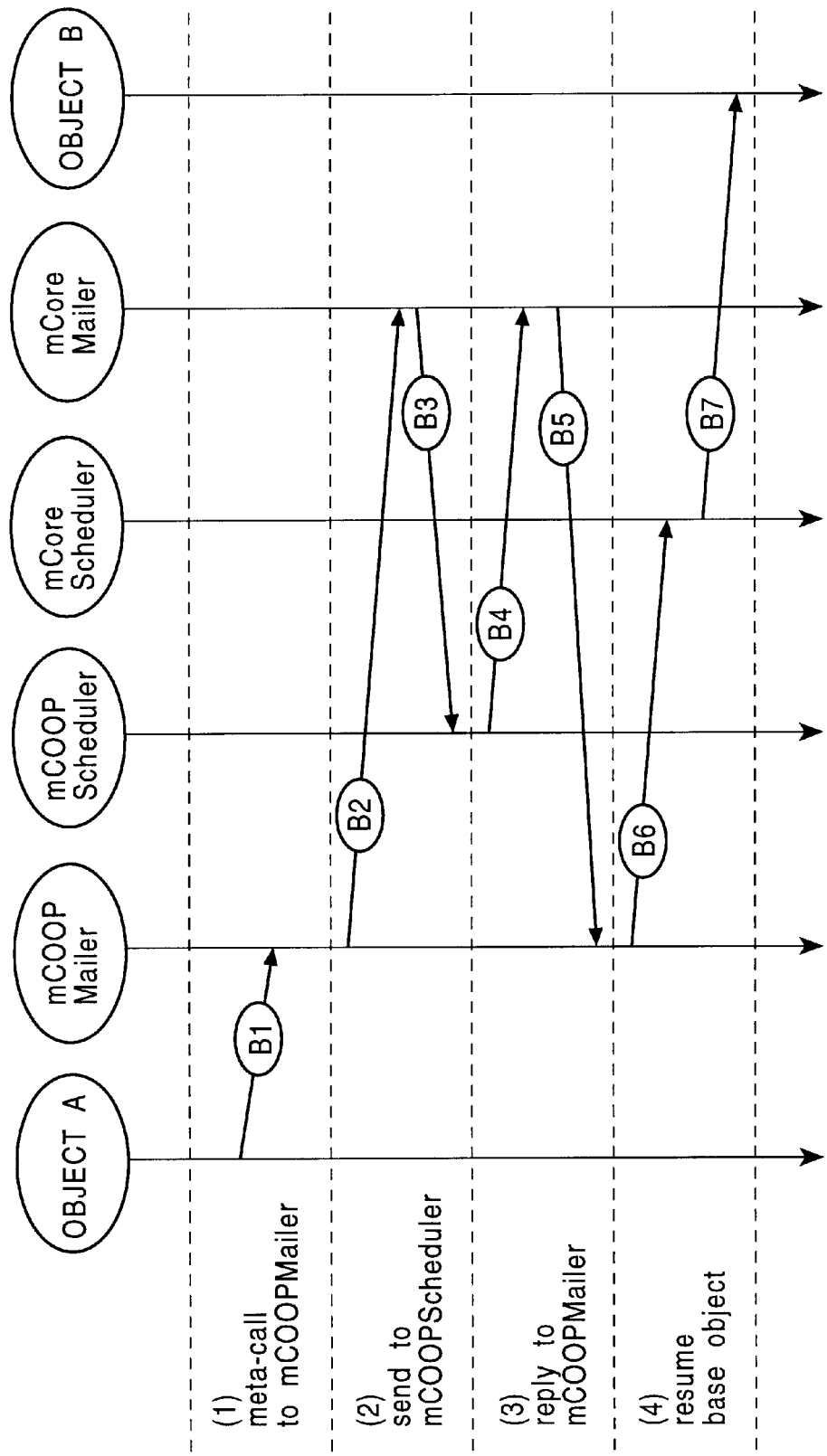
FIG. 6 is an illustration of the schedule managing mechanism of the invention showing, by means of a time chart, object interaction between the object A and the object B to enable the sending of message from the object A to the object B.

A schedule managing procedure in accordance with the present invention will now be described through illustration of an embodiment with specific reference to FIGS. 5 and 6. In order to facilitate the comparison between the schedule management procedure of the invention and the conventional procedure, the following description proceeds based on a case where, as in the description of the conventional procedure, a message is sent from an object A which is an application program that runs on the meta-space mCOOP to an object B which is another application program that runs on the same meta-space mCOOP. FIG. 5 shows, similarly to FIG. 3, the procedure of sending message from the object A to the object B, together with the hierarchical structure of the operating system, while FIG. 6 shows, similarly to FIG. 4, a time chart of object interactions during sending of the message from the object A to the object B.

The procedure is as follows.

(1) Meta-Call to mCOOPMailer

As the first step, a meta-call is made by the object A to invoke the object "mCOOPMailer" on the meta-space mCOOP. Thus, in order to enable message passing from the object A to the object B, the object "mCOOPMailer" that undertakes message passing between objects on the meta-space mCOOP is invoked.

In this case, the object "mCOOPMailer" is directly invoked by the meta-call from the object A, as indicated by the arrow B1. The object A necessarily waits for the completion of the processing by the object "mCOOPMailer". Thus, a seriality exists in the execution transition from the object A to the object "mCOOPMailer", so that the call is made to directly invoke the object "mCOOPMailer" without taking the labor of invoking the object "mCoreScheduler" which is invoked in the conventional procedure for the purpose of schedule management.

(2) Send to mCOOPScheduler.

Then, in order to start the object B, the object "mCOOPMailer" sends a message to the object "mCOOPScheduler" on the meta-space mCOOP. More specifically, the starting of the object B requires schedule management of objects running on the meta-space mCOOP. The above-mentioned message which is necessary to start the object B is therefore sent to the object "mCOOPScheduler" which is the meta-object in charge of the schedule management of the objects on the meta-space mCOOP.

To explain in more detail, the sending of the message from the object "mCOOPMailer" to the object "mCOOPScheduler" begins with a call indicated by the arrow B2 for invoking the object "mCoreMailer" which is the meta-object in charge of the message passing between objects working on the meta-space mCore. Subsequently, as indicated by the arrow B3, the object "mCOOPScheduler" is directly invoked and the above-mentioned message necessary for starting the object B is sent to this object "mCOOPScheduler".

It is to be understood that the object "mCOOPMailer" necessarily waits for completion of the processing performed by the object "mCOOPScheduler". Thus, seriality exists in the execution transition from the object "mCOOP-Mailer" to the object "mCOOPScheduler". Therefore, the call B3 is made to directly invoke the object "mCOOP-Scheduler" without taking the labor of invoking the object "mCoreScheduler" which is invoked in the conventional procedure for the purpose of schedule management. Thus, in accordance with the invention, message passing between objects on the same meta-space, when there is seriality in the execution transition, is conducted skipping over the step of invoking the scheduler. This style of message passing will be referred to as "FastSend" in the following description.

(3) Reply to mCOOPMailer

Upon receipt of the message, the object "mCOOPScheduler" alters the state of the object B in accordance with the received message and sends a reply for this message to the object "mCOOPMailer" by "FastSend".

To explain in more detail, this replying operation is performed as follows. In order to enable sending of the reply from the object "mCOOPScheduler" to the object "mCOOPMailer", a call is made as indicated by the arrow B4 to invoke the object "mCoreMailer" that undertakes message passing between the objects running on the meta-space mCore. Then, the object "mCOOPMailer" is directly invoked as indicated by the arrow B5, and the reply from the object "mCOOPScheduler" is sent to this object "mCOOP-Mailer". Seriality exists in the execution transition from the object "mCOOPScheduler" to the object "mCOOPMailer". Therefore, the call B5 is made to allow direct send of the reply to the object "mCOOPMailer" without taking the labor of invoking the object "mCoreScheduler" which is invoked in the conventional procedure for the purpose of schedule management.

(4) Resume Base Objects

Processing in the objects A and B is commenced when the processing performed by the object "mCOOPMailer" is completed.

This handling begins with a call indicated by the arrow B6 for invoking the object "mCoreScheduler". After a processing such as rescheduling is performed by the object "mCoreScheduler", the object B as a base object is called as indicated by the arrow B7, whereby the processing is started. It is to be noted, however, the processing is started first with the object A, i.e., the arrow B7 calls the object A, if priority has been given to the processing in the object A than to the processing in the object B.

As will be understood from the foregoing description, the present invention omits the steps of invoking the scheduler, by virtue of the use of the "FastSend" function and the mechanism that enables direct call of meta-object. Thus, the present invention reduces the number of the context switches to be performed, offering an improvement in the overall performance of the system over the system relying on the conventional schedule managing mechanism.

Although in the foregoing description a message passing processing is specifically described as an example of processing that can enjoy the advantage of skipping over the step of invoking the scheduler, the same advantage can be attained also in other kinds of processing. For instance, the omission of invoking the scheduler may also be effected in an interrupt processing. In such a case, interrupt latency can be shortened due to elimination of the time to be spent for calling the scheduler. Thus, the omission of calling the scheduler can suitably be employed in the processing that needs a prompt execution such as processing to be executed in response to an interrupt.

2-4-2 Delayed Queuing Mechanism

A mere omission of the step of calling the scheduler, however, may cause a discordance between the actual statuses of objects and those understood by the scheduler, thus posing a risk of error in the system operation. In accordance with the present invention, therefore, a mechanism is used for ensuring matching between the actual statuses of objects and those grasped by the scheduler. This mechanism will be referred to as a "delayed queuing mechanism" in this specification.

Figure 7:
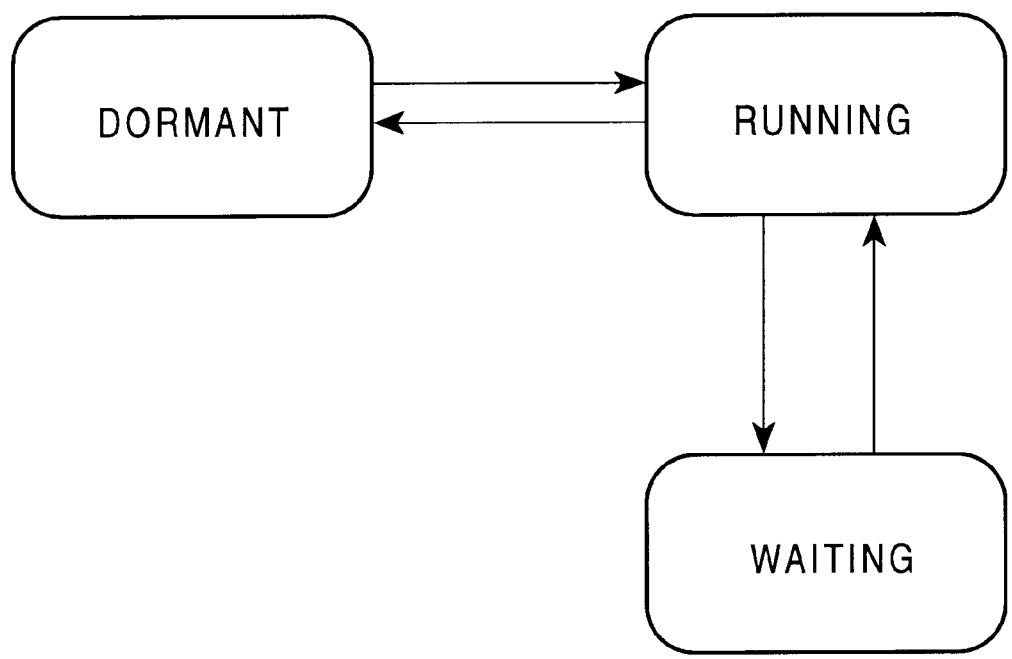
FIG. 7 is a diagram showing transition of thread status.

Before turning to the description of the delayed queuing mechanism, a reference is made to FIG. 7 that illustrates the statuses of threads of the objects.

One thread is allocated to each object, and the schedule management performed by the scheduler is conducted on thread basis. It is assumed here that the thread can take one of the three statuses "dormant", "waiting" and "running". The status "dormant" means that the thread is not active since the associated object has nothing to do. The status "waiting" means that the thread is not active as the associated object is waiting for a certain event. The status "running" means that the object is under execution. Thus, the status "running" indicates that the thread is active or that the thread is in a queue under the control of the scheduler and is waiting for allocation of CPU processing time. The scheduler alters the status of the thread of an object and updates the queue in the thread upon request from another object.

The delayed queuing mechanism will now be described.

The use of the delayed queuing mechanism necessitates allocation of a structure to each thread. When execution transition is made by a context switch from one thread (referred to as a "source thread") to another thread (referred to as a "target thread"), the history of the context switch is recorded in the structure. The "history of context switch" shows, for each thread, the nature of the execution transition, as well as the thread by which each thread has been activated as a result of the execution transition. Thus, the history of context switch includes information identifying the thread that was under execution immediately before the execution transition, i.e., the source thread, information identifying the cause that has triggered the target thread, e.g., a meta-call or a "FastSend".

When the scheduler is invoked, the delayed queuing mechanism retrieves the history recorded in the structure so as to attain matching between the actual object status and the status understood by the scheduler. More specifically, when the scheduler is invoked, the delayed queuing mechanism is started to trace back the history of the context switches performed as of the last call for the scheduler, by making reference to the information recorded in the structure. The delayed queuing mechanism, based on the recorded history, alters the object status recognized by the scheduler in conformity with the actual object status, while updating the queue in the thread, whereby matching is attained between the actual object status and the object status managed by the scheduler.

Thus, the threads to be placed under the operation of the delayed queuing mechanism are the threads that have been triggered without taking the step of invoking the scheduler. More specifically, these threads include a train of threads from the thread which was running immediately before the present invocation of the scheduler (this thread is referred to as the "currentThread") back to the thread which the scheduler has triggered in response to the last call. This thread will be referred to as "activeThread"). Thus, the thread "activeThread" triggered by the scheduler in response to the last invocation is the thread that is recognized by the scheduler as being presently running.

The delayed queuing mechanism conducts updating of the information concerning the thread status as recognized by the scheduler, in accordance with the rule shown in Table 1 below.

TABLE 1

| | Source thread status | | Target thread status | |
| --- | --- | --- | --- | --- |
| | Before context switch | After context switch | Before context switch | After context switch |
| meta-call | RUNNING | WAITING | DORMANT | RUNNING |
| FastSend | RUNNING | RUNNING | DORMANT | RUNNING |

Thus, if the target thread has been started as a result of a context switch caused by a meta-call, the source thread after this context switch is set to the status WAITING and the target thread after this context switch is set to the status RUNNING. In contrast, if the target thread has been started as a result of a context switch caused by a FastSend, the source thread after this context switch is set to the status RUNNING and the target thread after this context switch also is set to the status RUNNING. The statuses of the source thread and the target thread are essentially DORMANT regardless of whether the context switch has been caused by a meta-call or a FastSend.

Figure 8:
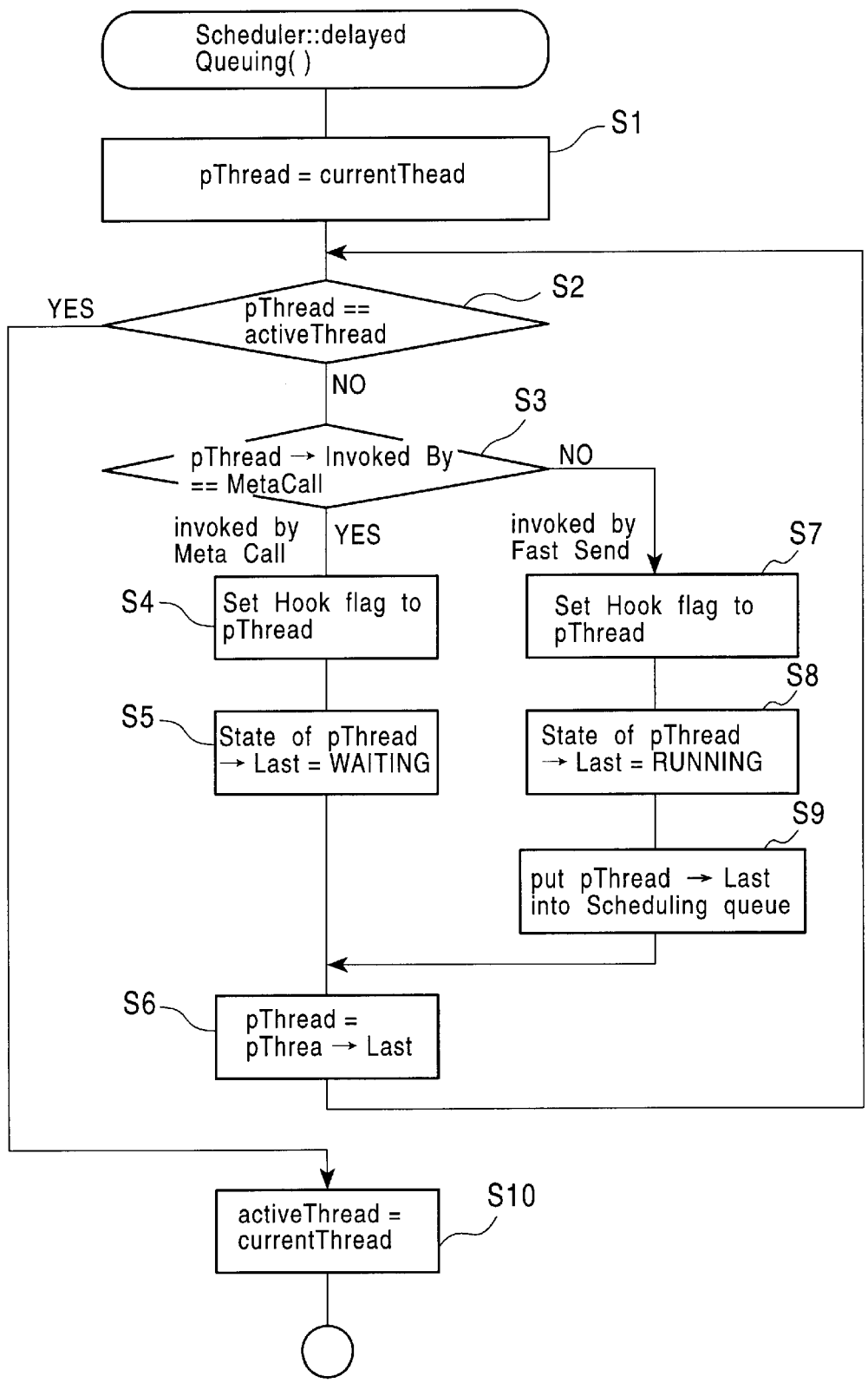
FIG. 8 is a flowchart showing an algorithm of a delayed queuing mechanism.

A detailed description will now be given of the algorithm of the delayed queuing mechanism, with specific reference to a flowchart shown in FIG. 8. In this flowchart, as well as in a flowchart shown in FIG. 9, the processing performed in each step is described by using expressions which follow an object-oriented programming language C++.

The delayed queuing mechanism is implemented by a method "Scheduler::DelayedQueuing( )" described in the scheduler. In other words, when the scheduler is invoked, the method "Scheduler::DelayedQueuing( )" is preferentially executed to activate the delayed queuing mechanism.

In Step 1 of this method "Scheduler::DelayedQueuing( )", a thread "currentThread" had been active immediately before the scheduler was invoked is assigned to a variable "pThread" that is used in the delayed queuing mechanism. Thus, the variable "pThread", when Step 1 is completed, represents the thread which had been active when the scheduler was called.

In Step S2, the "pThread" is compared with the "activeThread" which is the thread that was activated by the scheduler in response to the last call for the scheduler, i.e., the thread that is recognized by the scheduler as being presently active. If the "pThread" and the "activeThread" are not the same, i.e., when the "pThread" does not indicate the thread that was activated by the scheduler last time, the process advances to Step S3. However, if the "pThread" and the "activeThread" are the same, i.e., when the "pThread" indicates the thread that was activated by the scheduler last time, the process skips to Step S10.

Step S3 determines whether the call for the thread indicated by the "pThread" has been invoked by a meta-call or by a "FastSend". The process advances to Step S4 if it is determined in Step S3 that the call was caused by a meta-call, otherwise, the process proceeds to Step S7. Thus, Step S7 is executed when it is determined in Step S3 that the call was invoked by a "FastSend".

The fact that the thread indicated by the "pThread" has been invoked by a meta-call means that this thread is the source thread that has caused a context switch from the base object to the meta-object. Step S4, therefore, sets a queue updating flag on this thread. In FIG. 8, the queue updating flag is expressed as "Hook flag". The queue updating flag is used by an asynchronous scheduler mechanism that will be described later. After the setting of the flag in Step S4, the process advances to Step S5.

Thus, Step S5 is executed because the thread indicated by the "pThread" has been invoked by a meta-call. Therefore, in Step S5, the status of the thread which was executed immediately before the thread indicated by the "pThread" is set to WAITING, in accordance with the rule shown in Table 1. After completion of the processing in Step S5, the process advances to Step S6.

In Step S6, the content of the "pThread" is changed such that the "pThread" indicates a thread which immediately precedes the thread that has been indicated by the "pThread", for the purpose of trace-back of the context history. The process then returns to Step S2 to repeat the described Steps.

In Step S7, a queue flag is set on the thread indicated by the "pThread", as in the case of Step S4. After the completion of the processing in Step S7, the process advances to Step S8.

Thus, Step S8 is executed because the thread indicated by the "pThread" has been invoked by a "FastSend". Therefore, in Step S8, the status of the thread which immediately precedes the thread indicated by "pThread" is set to "RUNNING", in accordance with the rule shown in Table 1. After the processing in Step S8 is finished, the process advances to Step S9.

In Step S9, the thread which immediately precedes the thread indicated by the "pThread", i.e., the thread whose status was set to RUNNING in Step S8 is added to the queue of the thread that is under the management of the scheduler. After completion of the processing in Step S9, the process advances to Step S6.

As described before, in Step S6, the content of the "pThread" is changed such that the "pThread" indicates a thread which immediately precedes the thread that has been indicated by the "pThread", for the purpose of trace-back of the context history. The process then returns to Step S2 to repeat the described Steps.

As stated before, the process skips at once to Step S10 if the comparison conducted in Step S2 indicates that the "pThread" indicates the same thread as that activated by the scheduler last time. In Step S10, the "currentThread" is assigned to the "activeThread". The "activeThread" is the thread that is recognized by the scheduler as being active, while the "currentThread" is the thread which was active immediately before the scheduler was invoked. Thus, after completion of the processing conducted in Step S10, the thread recognized by the scheduler as being active is identical with the thread which was active immediately before the scheduler is invoked.

It will be seen that skipping from Step 2 to Step 10 over Steps S3 through S9 occurs only when the "currentThread" and the "activeThread" are the same from the beginning, i.e., when the thread that has invoked the scheduler is the same as the thread that was invoked by the scheduler last time.

When no context switch omitting calling of the scheduler exists in the context switch history, the thread by which the scheduler is now being invoked and the thread invoked by the scheduler last time are the same. In contrast, when the context switch history includes a context switch that has omitted invocation of the scheduler, the thread by which the scheduler is now being invoked and the thread invoked by the scheduler last time are not the same.

Thus, the "currentThread" and the "activeThread" are the same from the beginning of the process if there is no context switch omitting the calling of the scheduler. In such a case, the process skips over Steps S3 to S9 to Step S10 from Step S2 that follows Step S1. In this case, no processing is conducted in Step S10 materially, because the "activeThread" and the "currentThread" have already been the same. In contrast, when a context switch exists that was executed without invoking the scheduler, the "currentThread" and the "activeThread" are not the same, so that Steps S3 onwards are executed to trace back the history of context switches to locate the context switch that was executed without calling the scheduler.

Alteration and updating of the thread and the queue that were omitted at the time of a previous context switch are therefore completed, thus achieving matching between the actual object status and the object status understood by the scheduler.

It will be clear to those skilled in the art that the delayed queuing mechanism described hereinbefore can also be employed in the case where the calling of the scheduler has been omitted due to necessity of an urgent processing such as an interrupt, although in the described embodiment the delayed queuing mechanism is used in the case where the calling of the scheduler was omitted in the course of message passing.

Figure 9:
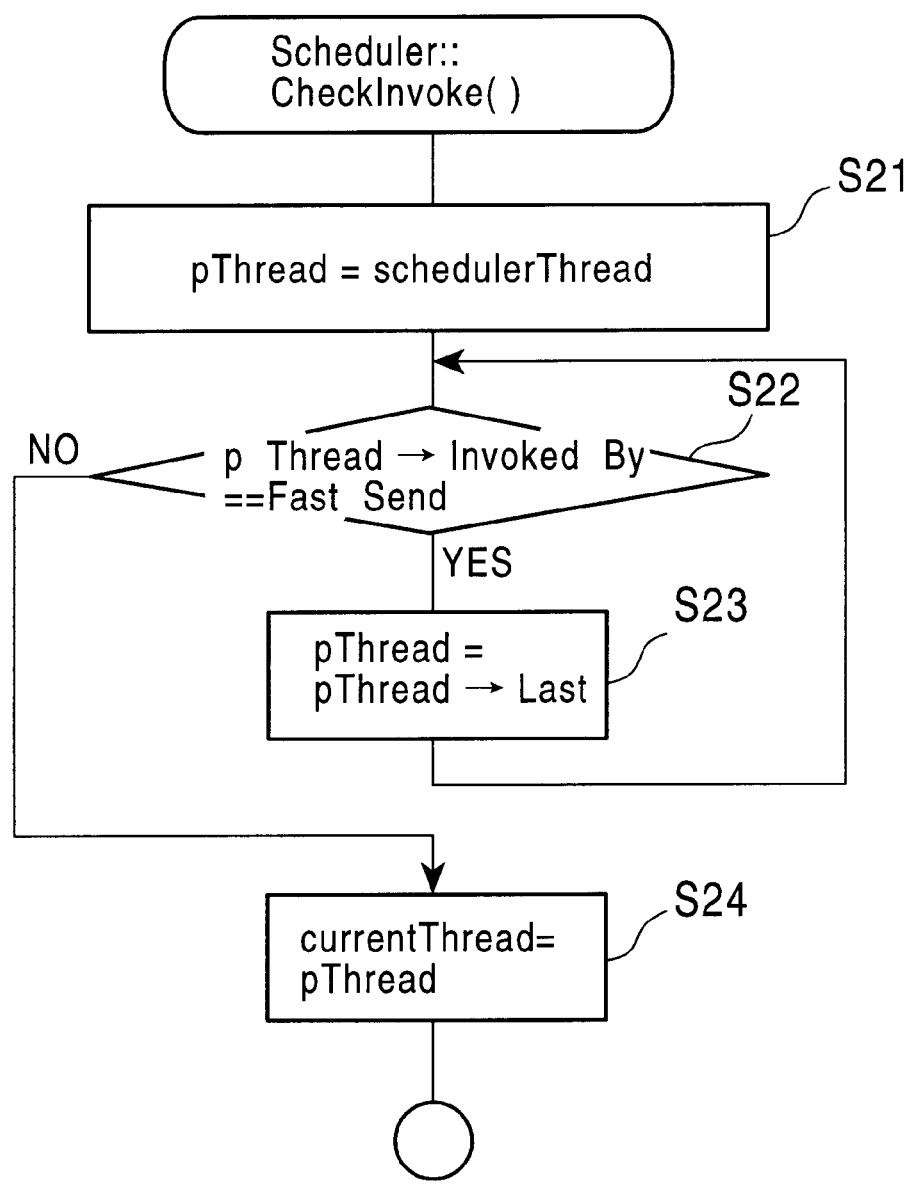
FIG. 9 is a flowchart showing n algorithm for setting "currentThread" in the delayed queuing mechanism.

When the seriality of context switch between objects of the same meta-space as the scheduler is not affected by the alteration of status of the object performed by the delayed queuing mechanism, the "currentThread" may be set by a method "Scheduler::CheckInvoke( )" that follows a flow as shown in FIG. 9, in advance of the processing performed by the "Scheduler::DelayedQueue".

The method "Scheduler::CheckInvoke( )" begins with Step S21 which assigns a "SchedulerThread" to the "pThread". The "SchedulerThread" means the thread of the scheduler. Thus, after the completion of Step S21, the "pThread" indicates the thread of the scheduler.

Step S22 determines whether or not the invocation of the thread indicated by the "pThread" has been caused by a "FastSend". If the answer is YES, i.e., if a "FastSend" has invoked this thread, the process advances to Step S23.

The fact that the thread indicated by the "pThread" has been invoked by a "FastSend" means that this thread and the thread which immediately precedes this thread are the threads of meta-objects of the same meta-space as the scheduler. Thus, Step S23 is executed only when the thread indicated by the "pThread" and the immediately preceding thread are the threads of meta-objects of the same meta-space as the scheduler. In this case, therefore, the "currentThread" which causes the delayed queuing mechanism to act can trace back to the thread that immediately precedes the "currentThread". Therefore, in Step S23, the "pThread" is updated to indicate the thread that immediately precedes the thread that has been indicated by the "pThread". The process then returns to Step S22 to repeat Steps S22 and S23.

In contrast, when it is determined in Step S22 that the invocation of the thread indicated by the "pThread" was not done by a "FastSend", the process skips to Step S24. It will be seen that this skip is performed when the thread immediately preceding the thread indicated by the pThread is not the thread of a meta-object of the same meta-space as the scheduler.

In Step S24, the "pThread" is assigned to the "currentThread", so that the thread indicated by the "pThread" is set to the thread indicated by the "currentThread". When the processing of Step S24 is finished, therefore, the thread that immediately precedes the thread shown by the "currentThread" is not the thread of an object of the same meta-space as the scheduler.

After completion of the setting of the "currentThread" by execution of Step S24, the processing of the method "Scheduler::CheckInvoke( )" is finished and the process advances to the processing of the above-mentioned method "Scheduler::DelayedQueuing( )".

Thus, the processing of the method "Scheduler::DelayedQueuing( )" is conducted after the setting of the "currentThread". This processing sequence reduces the processing for updating the status of the scheduler by trace back of the switch context history, thus contributing to improvement in the efficiency of the processing.

2-4-3 Asynchronous Scheduler Invocation Mechanism

A queue updating flag is set when the queue is altered by the delayed queuing mechanism, and re-scheduling is performed by calling the scheduler asynchronously based on the flag. More specifically, when the delayed queuing mechanism is activated, a queue updating flag is set for a source switch which triggers a context switch that requires rescheduling. When this context switch is activated, the scheduler is invoked to perform the rescheduling. This mechanism will be referred to as an "asynchronous scheduler invocation mechanism".

The procedure of the processing performed by the asynchronous scheduler invocation mechanism is as follows.

(1) When an updating of queue is effected by the delayed queuing mechanism, a queue updating flag is set for a source thread that triggers a context switch from a meta-object to a base object. The setting of this flag is performed in Steps S4 and S7 of the flow described before with reference to FIG. 8.

(2) When a context switch from a meta-object to a base object has occurred, check is made as to whether or not a queue updating flag has been set on the source thread, i.e., the thread of the meta-object, before activating the target thread, i.e., the thread of the base object. When such a flag on the source thread is confirmed, the scheduler is invoked instead of the target thread. The scheduler performs rescheduling in advance of the context switch from the meta-object to the base object.

The setting of the queue updating flag is performed as follows, depending on the conditions under which the queue is altered by the scheduler.

(1) When the delayed queuing mechanism has been executed by an object "mCoreScheduler", a queue updating flag is set on the thread that causes a context switch from an object constituting the meta-space mCore to an object that runs on the meta-space mcore. This is done also in the case where the scheduler is commonly possessed by all the meta-spaces, when the scheduler acts as a meta-object of the meta-space mCore to execute the delayed queuing mechanism.

(2) When the delayed queuing mechanism has been executed by an object "mCOOPScheduler" invoked by a meta-object of the meta-space mcore, a queue updating flag is set on the thread that causes a context switch from a meta-object constituting the meta-space COOP to an object that runs on the meta-space mCOOP. This is done also in the case where the scheduler is commonly possessed by all the meta-spaces, when the scheduler acts as a meta-object of the meta-space mCOOP to execute the delayed queuing mechanism. The setting of the flag is conducted by altering the thread that initiates the delayed queuing mechanism, by using the method "Scheduler::CheckInvoke( )" that is shown in FIG. 9.

A detailed description will be given of the asynchronous scheduler invocation mechanism that uses the above-described queue updating flag. By way of example, the description will proceed on a case where a message is sent from an object A that runs on the meta-space mCOOP to an object C that runs on the meta-space mDrive. It is also assumed that the scheduler is commonly possessed by all the meta-spaces. That is, schedule management is conducted on all the meta-spaces, by means of the common object "Scheduler".

Figure 10:
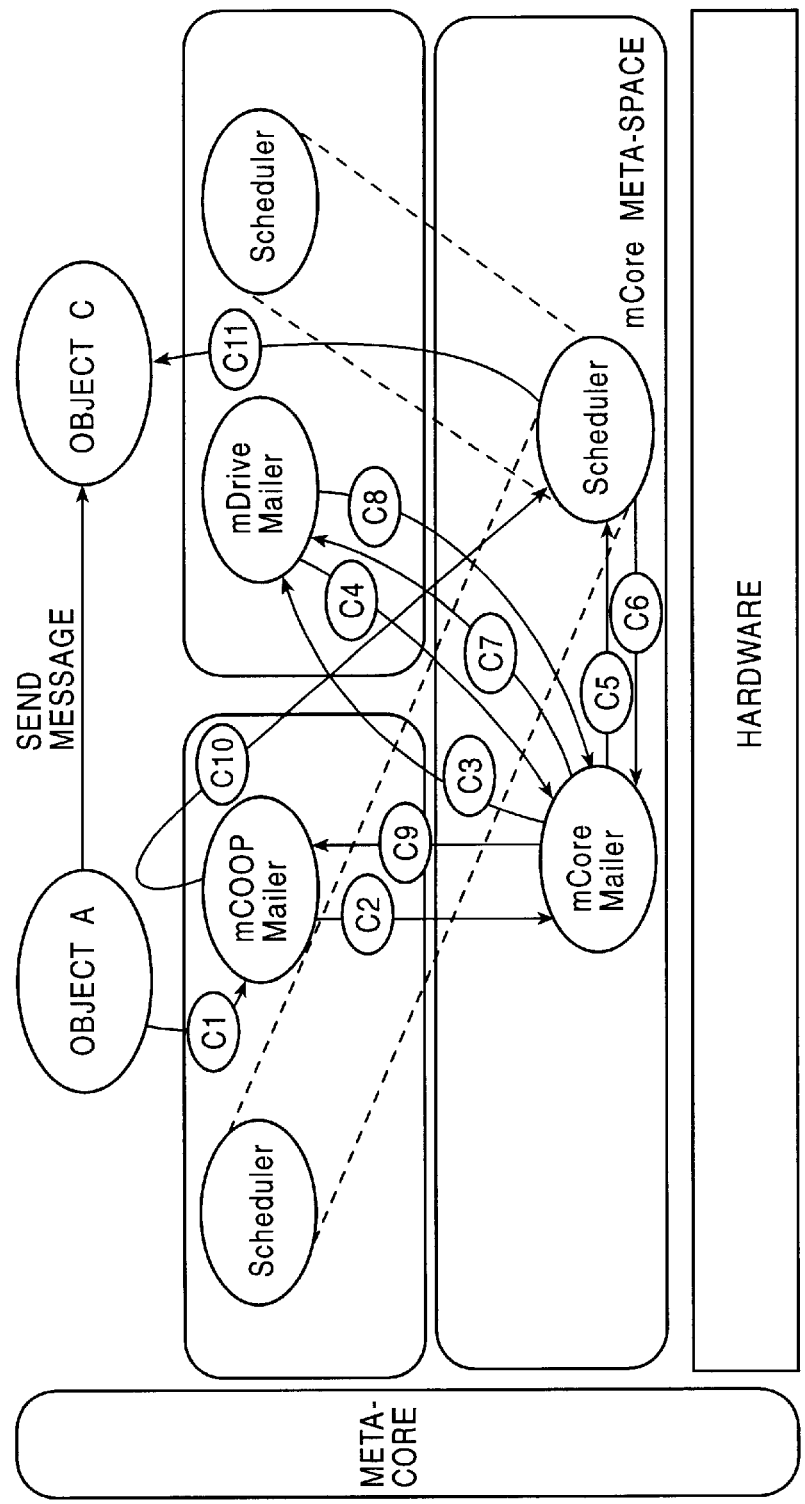
FIG. 10 is an illustration of a procedure for sending message from an object A to another object C by means of an asynchronous scheduler calling mechanism, showing also the hierarchical structure of an operating system.
Figure 11:
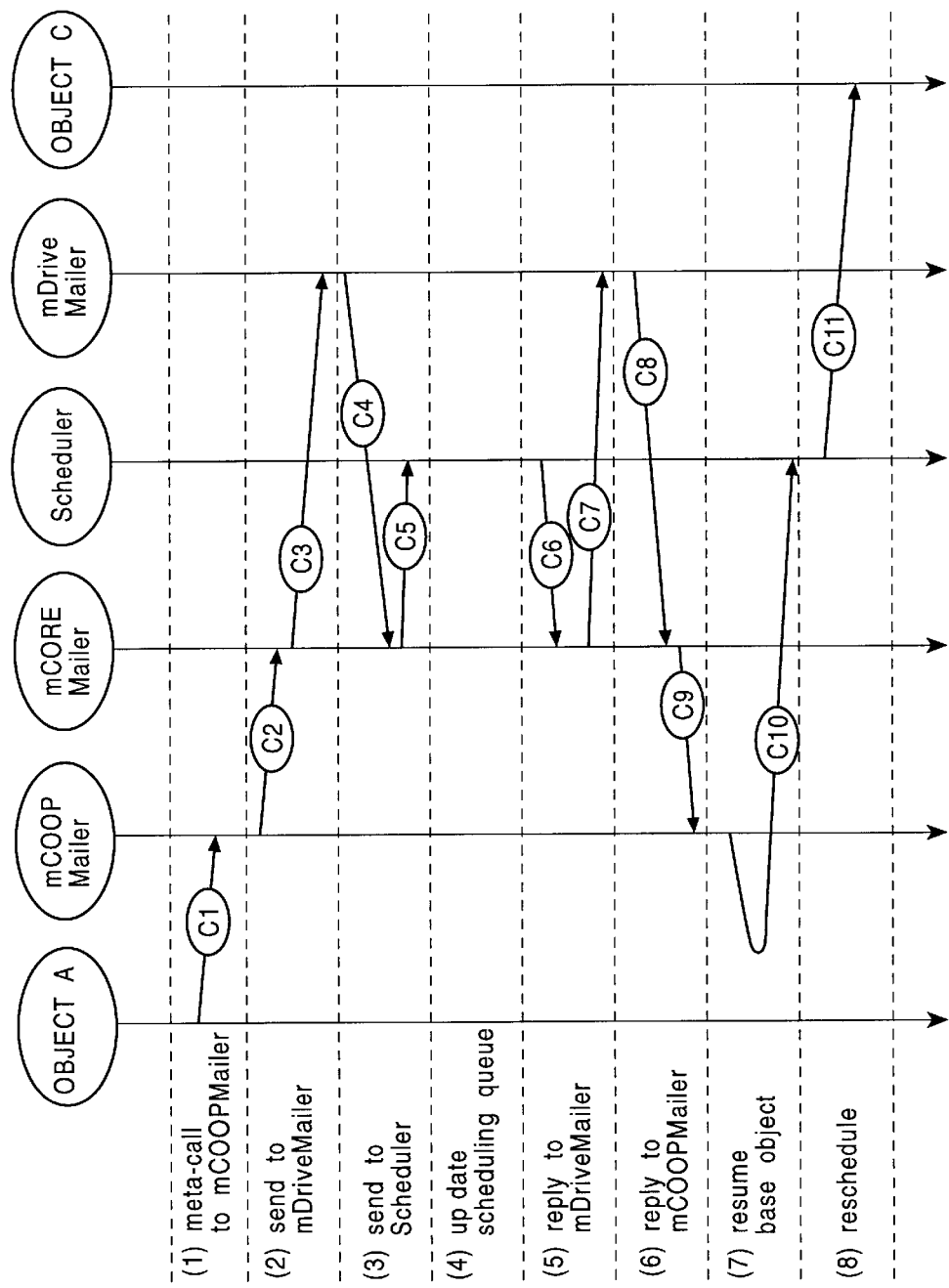
FIG. 11 is a time chart showing object interaction between the object A and the object C for sending message from the object A to the object C by means of the asynchronous scheduler calling mechanism.
Figure 12:
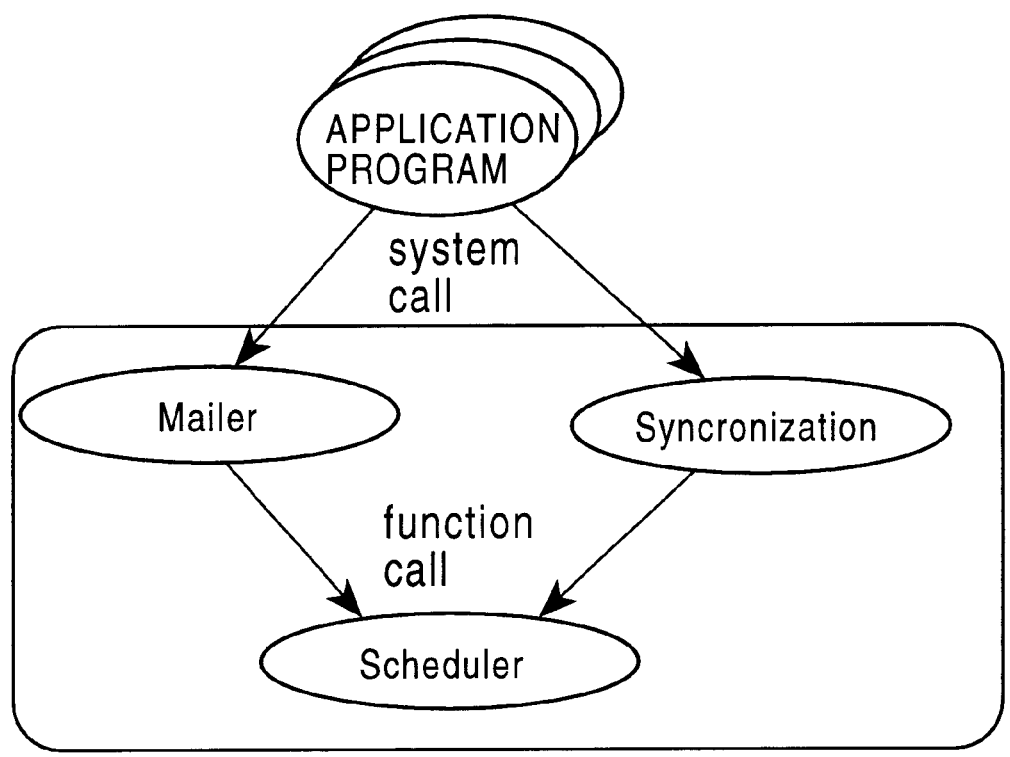
FIG. 12 is an illustration of an operating system employing a fat kernel.
Figure 13:
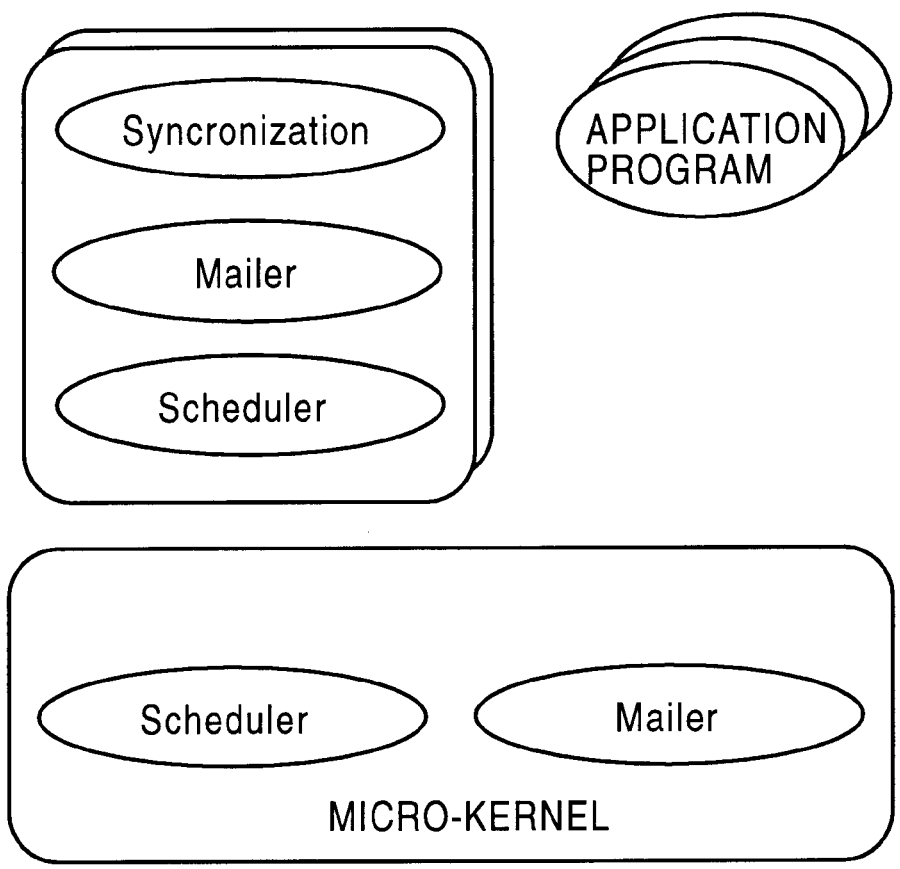
FIG. 13 is an illustration of an operating system employing a micro-kernel.
Figure 14:
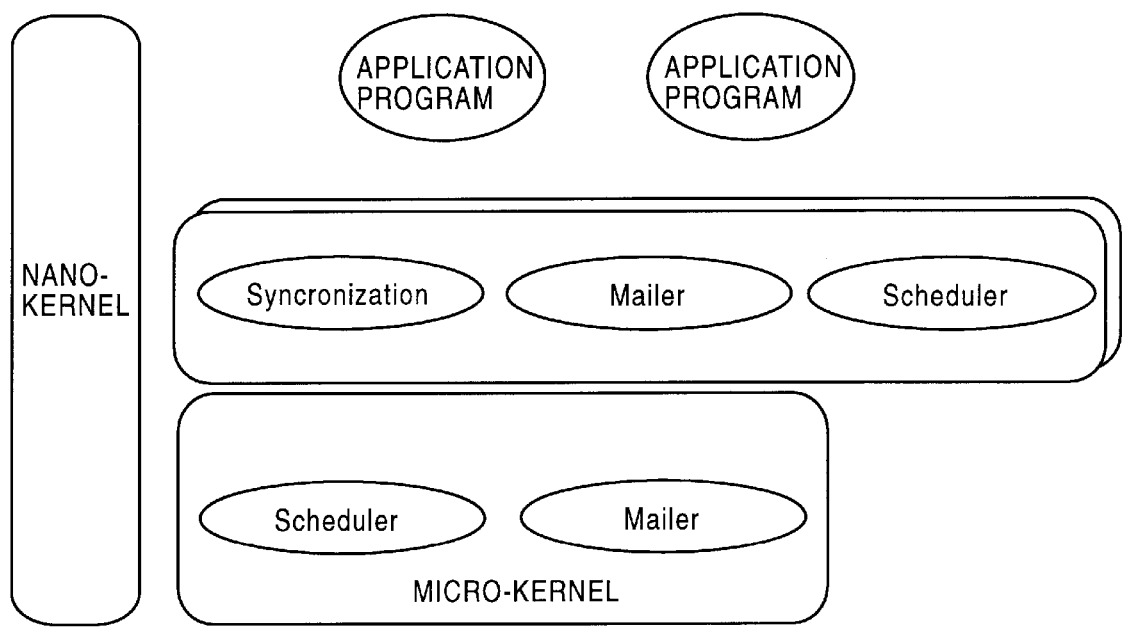
FIG. 14 is an illustration of an operating system employing a nano-kernel.

FIGS. 10 and 11 show the procedure of the message passing from the object A to the object C. More specifically, FIG. 10 shows, as in the cases of FIGS. 3 and 5, the procedure together with the hierarchical structure of the operating system. FIG. 11 is a time chart showing, as in the cases of FIGS. 4 and 6, object interaction performed during the passing of the message which, in this case, is sent from the object A to the object C.

The procedure is as follows.

(1) Meta-Call to mCOOPMailer

The object A invokes an object "mCOOPMailer" of the meta-space mCOOP by a meta-call. Thus, the object "mCOOPMailer" that undertakes the message passing performed by an object running on the meta-space mCOOP is invoked, in order to enable the message passing from the object A to the object B.

In this case, the object "mCOOPMailer" is directly invoked by the meta-call from the object A, as indicated by the arrow C1. Thus, the object "mCOOPMailer" is directly invoked without necessitating invocation of the object "Scheduler" for the purpose of schedule management, because seriality exists in the execution transition from the object A to the object "mCOOPMailer".

(2) Send to mDriveMailer

The object C as the message-destination object is on the meta-space mDrive. Therefore, a message that requests the message passing to the object C is sent to the object "mDriveMailer" that is a meta-object in charge of message passing by objects that run on the meta-space mDrive.

More specifically, in order to enable message passing from the object "mCOOPMailer" to the object "mDriveMailer", invocation is conducted as indicated by the arrow C2 to invoke the object "mCoreMailer" which is the meta-object in charge of message passing between objects running on the meta-space mCore. Subsequently, as indicated by the arrow C3, the object "mDriveMailer" is directly invoked. It is to be noted that the object "mDriveMailer" is directly invoked without necessitating invocation of the "Scheduler" for the purpose of schedule management, because seriality exists in the execution transition from the object "mCOOPMailer" to the object "mDriveMailer". In other words, a "FastSend" achieves the message passing from the object "mCOOPMailer" to the object "mDriveMailer".

(3) Send to Scheduler

Then, the object "mDriveMailer" sends a message to the object "Scheduler", in order to activate the object C. Activation of the object C requires schedule management. To this end, the message necessary for activating the object C is sent to the object "Scheduler" which is a meta-object in charge of schedule management.

More specifically, for the purpose of enabling message passing from the object "mDriveMailer" to the object "Scheduler", invocation is performed as indicated by the arrow C4 to invoke the object "mCoreMailer" which is the meta-object that undertakes message passing between objects running on the meta-space mCore. Subsequently, the object "Scheduler" is directly invoked as indicated by the arrow C5, and the message necessary for activating the object C is sent to this object "Scheduler". It is to be noted that the object "Scheduler" is directly invoked without the step of scheduling, because seriality exists in the execution transition from the object "mCOOPMailer" to the object "Scheduler". Thus, the message passing from the object "mDriveMailer" to the object "Scheduler" is performed by "FastSend".

(4) Update scheduling queue

Then, the object "Scheduler" alters the status of the object C based on the received message, and causes the delayed queuing mechanism to alter the queue.

The object "Scheduler" has been invoked for the purpose of altering the status of the object C and, therefore, is acting as a meta-object of the meta-space mDrive. Therefore, the object "Scheduler" sets a queue updating flag on a thread that activates a context switch for resuming execution of an object running on the meta-space mDrive or a context switch for resuming execution of an object running on the meta-space mCOOP that is of the same hierarchical level as the meta-space mDrive. More specifically, the object "Scheduler" sets a queue updating flag on the thread of the object "mCOOPMailer".

This operation can practically be implemented by tracing, using the algorithm of the method "Scheduler::CheckInvoke( )", the object execution transition in the following sequence, and thereafter executing the delayed queuing mechanism starting from the object "mCoreMailer(2)":

object "Scheduler" object "mCoreMailer(1)" object "mDriveMailer" object "mCoreMailer(2)" object "mCOOPMailer" object A The object "mCoreMailer(1)" and the object "mCoreMailer(2)" are the same object. Suffixes (1) and (2) are attached to show the difference in the timing at which this object is invoked.

(5) Subsequently, the object "Scheduler" sends a reply to the object "mDriveMailer", in response to the message that has been sent by "FastSend" to the object "Scheduler" from the object "mDriveMailer". More specifically, to enable the reply to be sent from the object "Scheduler" to the object "mDrive", invocation is performed as indicated by the arrow C6 to invoke the object "mCoreMailer" which is a meta-object that undertakes message passing between objects running on the meta-space mCore. Then, the object "mDriveMailer" is directly invoked as indicated by the arrow C7, and the reply from the object "Scheduler" is sent to this object "mDrive". The reply is sent directly to the object "mDriveMailer" without taking the step of scheduling, because of the seriality of the execution transition from the object "Scheduler" to the object "mDriveMailer". Execution of the object "mDriveMailer" is thus resumed.

(6) Reply to mCOOPMailer

Then, the object "mDriveMailer" sends a reply to the object "mCOOPMailer" in response to the message that has been sent by "FastSend" from the object "mCOOPMailer". More specifically, to enable the reply to be sent from the object "mDrive" to the object "mCOOPMailer", invocation is performed as indicated by the arrow C8 to invoke the object "mCoreMailer" which is a meta-object that undertakes message passing between objects running on the meta-space mCore. Then, the object "mCOOPMailer" is directly invoked as indicated by the arrow C9, and the reply from the object "mDriveMailer" is sent to this object "mCOOPMailer". The reply is sent directly to the object "mCOOPMailer" without taking the step of scheduling, because of the seriality of the execution transition from the object "mDriveMailer" to the object "mCOOPMailer". Execution of the object "mCOOPMailer" is thus resumed.

(7) Resume Base Object

After completion of the processing performed by the object "mCOOPMailer", a context switch processing is to be performed to switch the context to the object A, in order to resume the object A. It is to be understood, however, that a queue updating flag has been set on the thread of the object "mCOOPMailer" that is the source thread of this context switch. Therefore, actually, activation of the asynchronous invocation mechanism is performed rather than the context switch to the object A. Namely, resumption of the object A is not performed but the object "Scheduler" is invoked, as indicated by the arrow C10.

(8) Reschedule

Rescheduling is therefore performed by the object "Scheduler". It is assumed here that the schedule of the queue has been updated to cause the object C to be executed prior to the execution of the object A. Rescheduling is thus performed by the object "Scheduler" such that the object C is to be executed next. The object C is therefore invoked as indicated by the arrow C11 and then executed.

It will be seen that the number of times of invocation of the scheduler, i.e., the object "Scheduler", can appreciably reduced. This owes to the use of the asynchronous scheduler invocation mechanism in the message passing operation for sending the message from the object A to the object C. More specifically, in the illustrated embodiment, scheduling is delayed for the objects that run on the meta-space "mCOOP" or "mDrive", and the scheduler is invoked in an asynchronous manner when a context switch has occurred to resume the thread of the object A. It will be understood that the number of timed of invoking the scheduler is reduced by 2 as compared with the case where the scheduler is called each time the context switch for replying to "FastSend" message is performed.

In the embodiment described hereinbefore, updating of the queue under the control of the scheduler is effected only for the objects that run on the meta-space "mCOOP" and the meta-space "mDrive". Thus, the updating does not at all affect the object that run on the meta-space "mCore". The reduction in the number of times of invocation of the scheduler, afforded by the delaying of the scheduling for the objects running on the meta-spaces "mCOOP" and "mDrive", does not produce any undesirable effect on the operation of the whole system.

As will be understood from the foregoing description, the present invention minimizes the number of times of invocation of the scheduler while ensuring correct operation of the entire system, thus offering an improvement in the overall performance of the entire system while allowing the use of a nano-kernel.

Although the invention has been described through its preferred forms, it is to be understood that the described embodiment is only illustrative and various changes and modifications may be imparted thereto without departing from the scope of the invention which is limited solely by the appended claims.

What is claimed is:

1. A data processing method comprising the steps of:
recording, when context switching has occurred to switch a thread to be executed, a history of said context switching; and
updating, when a scheduler for controlling an execution sequence of threads is invoked, a queue managed by said scheduler, by tracing back the recorded history of the context switching, so as to attain matching between an actual object status and an object status recognized by the scheduler.

2. A data processing method comprising the steps of:
recording, when context switching has occurred to switch a thread to be executed, a history of said context switching; and
updating, when a scheduler for controlling an execution sequence of threads is invoked, a queue managed by said scheduler, by tracing back the recorded history of the context switching, wherein the step of updating the queue includes setting a predetermined flag on a thread that causes context switching which requires alteration of sequence in said queue, and invoking, in response to an occurrence of new context switching, said scheduler to alter the sequence in said queue when the thread that has caused said new context switching bears said flag.

3. A data processing method comprising the steps of:
recording, when context switching has occurred to switch a thread to be executed, a history of said context switching; and
updating, when a scheduler for controlling an execution sequence of threads is invoked, a queue managed by said scheduler, by tracing back the recorded history of the context switching, wherein the step of updating the queue includes setting a predetermined flag on a thread that causes context switching which requires alteration of sequence in said queue, and invoking, in response to an occurrence of new context switching, said scheduler to alter the sequence in said queue when the thread that has caused said new context switching bears said flag, wherein the thread on which said flag is set differs according to the type of the invocation of said scheduler.

4. A computer-readable recording medium containing an operating system that has a scheduler for controlling a sequence of execution of threads, said operating system implementing a data processing method which comprises:
recording, when context switching has occurred to switch a thread to be executed, a history of said context switching; and
updating, when a scheduler for controlling the execution sequence of threads is invoked, a queue managed by said scheduler by tracing back the recorded history of the context switching, so as to attain matching between an actual object status and an object status recognized by the scheduler.

5. A computer-readable recording medium containing an operating system that has a scheduler for controlling a sequence of execution of threads, said operating system implementing a data processing method which comprises:
recording, when context switching has occurred to switch a thread to be executed, the history of said context switching; and
updating, when a scheduler for controlling the execution sequence of threads is invoked, a queue managed by said scheduler by tracing back the recorded history of the context switching, wherein the step of updating the queue includes setting a predetermined flag on a thread that causes context switching which requires alteration of sequence in said queue, and invoking, in response to an occurrence of new context switching, said scheduler to alter the sequence in said queue when the thread that has caused the new context switching bears said flag.

6. A computer-readable recording medium containing an operating system that has a scheduler for controlling a sequence of execution of threads, said operating system implementing a data processing method which comprises:
recording, when context switching has occurred to switch a thread to be executed, the history of said context switching; and updating, when a scheduler for controlling the execution sequence of threads is invoked, a queue managed by said scheduler by tracing back the recorded history of the context switching, wherein the step of updating the queue includes setting a predetermined flag on a thread that causes context switching which requires alteration of sequence in said queue, and invoking, in response to an occurrence of new context switching, said scheduler to alter the sequence in said queue when the thread that has caused the new context switching bears said flag, wherein the thread on which said flag is set differs according to the type of the invocation of said scheduler.

7. A data processing apparatus having a computer-readable recording medium containing an operating system for implementing a data processing method which comprises the steps of:

recording, when context switching has occurred to switch a thread to be executed, a history of said context switching; and updating, when a scheduler for controlling an execution sequence of threads is invoked, a queue managed by said scheduler by tracing back the recorded history of the context switching, so as to attain matching between an actual object status and an object status recognized by the scheduler.

8. A data processing apparatus having a computer-readable recording medium containing an operating system for implementing a data processing method which comprises the steps of:

recording, when context switching has occurred to switch a thread to be executed, the history of said context switching; and updating, when a scheduler for controlling an execution sequence of threads is invoked, a queue managed by said scheduler by tracing back the recorded history of the context switching, wherein the step of updating the queue includes setting a predetermined flag on a thread that causes context switching which requires alteration of sequence in said queue, and invoking, in response to an occurrence of new context switching, said scheduler to alter the sequence in said queue when the thread that has caused the new context switching bears said flag.

9. A data processing apparatus having a computer-readable recording medium containing an operating system for implementing a data processing method which comprises the steps of:

recording, when context switching has occurred to switch a thread to be executed, the history of said context switching; and updating, when a scheduler for controlling an execution sequence of threads is invoked, a queue managed by said scheduler by tracing back the recorded history of the context switching, wherein the step of updating the queue includes setting a predetermined flag on a thread that causes context switching which requires alteration of sequence in said queue, and invoking, in response to an occurrence of new context switching, said scheduler to alter the sequence in said queue when the thread that has caused the new context switching bears said flag, wherein the thread on which said flag is set differs according to the type of the invocation of said scheduler.

* * * * *